(12) United States Patent
Hiraoka

(10) Patent No.: US 9,740,288 B2
(45) Date of Patent: Aug. 22, 2017

(54) ELECTRONIC DEVICE

(75) Inventor: Michiaki Hiraoka, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/000,140

(22) PCT Filed: Feb. 17, 2012

(86) PCT No.: PCT/JP2012/001081
§ 371 (c)(1),
(2), (4) Date: Aug. 16, 2013

(87) PCT Pub. No.: WO2012/111349
PCT Pub. Date: Aug. 23, 2012

(65) Prior Publication Data
US 2013/0321321 A1 Dec. 5, 2013

(30) Foreign Application Priority Data

Feb. 18, 2011 (JP) .................. 2011-033947

(51) Int. Cl.
*G06F 3/01* (2006.01)
*G06F 1/16* (2006.01)
*H04R 7/04* (2006.01)

(52) U.S. Cl.
CPC ............ *G06F 3/016* (2013.01); *G06F 1/1626* (2013.01); *G06F 1/1633* (2013.01);
(Continued)

(58) Field of Classification Search
CPC .... G06F 1/1626; G06F 1/1633; G06F 1/1656; G06F 1/1688; G06F 3/016; G06F 3/0414;
(Continued)

(56) References Cited

U.S. PATENT DOCUMENTS 7,248,305 B2 * 7/2007 Ootsuta et al. .................. 349/12
7,292,227 B2 * 11/2007 Fukumoto et al. ........... 345/173
(Continued)

FOREIGN PATENT DOCUMENTS

JP 02-214821 A 8/1990
JP 2002-149312 A 5/2002
(Continued)

OTHER PUBLICATIONS

An Office Action; "Notice of Reason for Rejection," issued by the Japanese Patent Office on Apr. 1, 2014, which corresponds to Japanese Patent Application No. 2012-557850 and is related to U.S. Appl. No. 14/000,140; with English language concise explanation.
(Continued)

*Primary Examiner* — Nelson Rosario
(74) *Attorney, Agent, or Firm* — Studebaker & Brackett PC

(57) ABSTRACT

The electronic device 1 is provided with a touch panel 3, vibration units 15 and 16 that vibrate the touch panel 3, and a display unit 18 disposed adjacent to the backside of the touch panel 3. The display unit 18 is held suspended from the touch panel 3 via a flexible member 24 disposed along the entire periphery of the display unit 18, improves dust resistance and water resistance, as an electronic device that includes and vibrates a panel forming the external appearance of the electronic device, while making it difficult to inhibit vibration of the panel.

5 Claims, 8 Drawing Sheets

(52) U.S. Cl.
CPC .......... *G06F 1/1656* (2013.01); *G06F 1/1688*
(2013.01); *H04R 7/045* (2013.01); *H04R*
*2400/03* (2013.01); *H04R 2499/11* (2013.01);
*H04R 2499/15* (2013.01)

(58) Field of Classification Search
CPC H04R 7/045; H04R 2400/03; H04R 2499/11;
H04R 2499/15; G02F 1/13338; G02F
1/133526
USPC .............. 345/173–179; 361/679.01, 679.02,
361/679.21, 679.26
See application file for complete search history.

(56) References Cited

U.S. PATENT DOCUMENTS

| | | | |
|---|---|---|---|
| 7,825,778 B2* | 11/2010 | Nishimura et al. ........ | 340/407.2 |
| 8,305,349 B2 | 11/2012 | Nakamura | |
| 8,456,432 B2 | 6/2013 | Kim et al. | |
| 2002/0175836 A1* | 11/2002 | Roberts ........................... | 341/34 |
| 2006/0181522 A1 | 8/2006 | Nishimura et al. | |
| 2009/0207152 A1 | 8/2009 | Nakamura | |
| 2010/0315355 A1* | 12/2010 | Kim ........................ | G06F 3/041 |
| | | | 345/173 |
| 2011/0074706 A1* | 3/2011 | Son ........................ | G06F 3/016 |
| | | | 345/173 |
| 2012/0056826 A1* | 3/2012 | Kim ........................ | G06F 3/041 |
| | | | 345/173 |
| 2013/0335357 A1* | 12/2013 | Hou ............................. | 345/173 |
| 2014/0145836 A1* | 5/2014 | Tossavainen et al. ..... | 340/407.2 |
| 2014/0306914 A1* | 10/2014 | Kagayama ............. | G06F 3/016 |
| | | | 345/173 |

FOREIGN PATENT DOCUMENTS

| | | |
|---|---|---|
| JP | 2006215776 A | 8/2006 |
| JP | 2007-026344 A | 2/2007 |
| JP | 2009-199729 A | 9/2009 |
| JP | 2010-044497 A | 2/2010 |
| JP | 2010-287207 A | 12/2010 |

OTHER PUBLICATIONS

International Search Report; PCT/JP2012/001081; May 22, 2012.
An Office Action; "Notice of Reason for Rejection," issued by the Japanese Patent Office on Oct. 27, 2015, which corresponds to Japanese Patent Application No. 2012-033175 and is related to U.S. Appl. No. 14/000,140; with English language concise explanation.
An Office Action; "Notice of Reason for Rejection," issued by the Japanese Patent Office on Mar. 31, 2015, which corresponds to Japanese Patent Application No. 2012-033175 and is related to U.S. Appl. No. 14/000,140; with English language concise explanation.

* cited by examiner

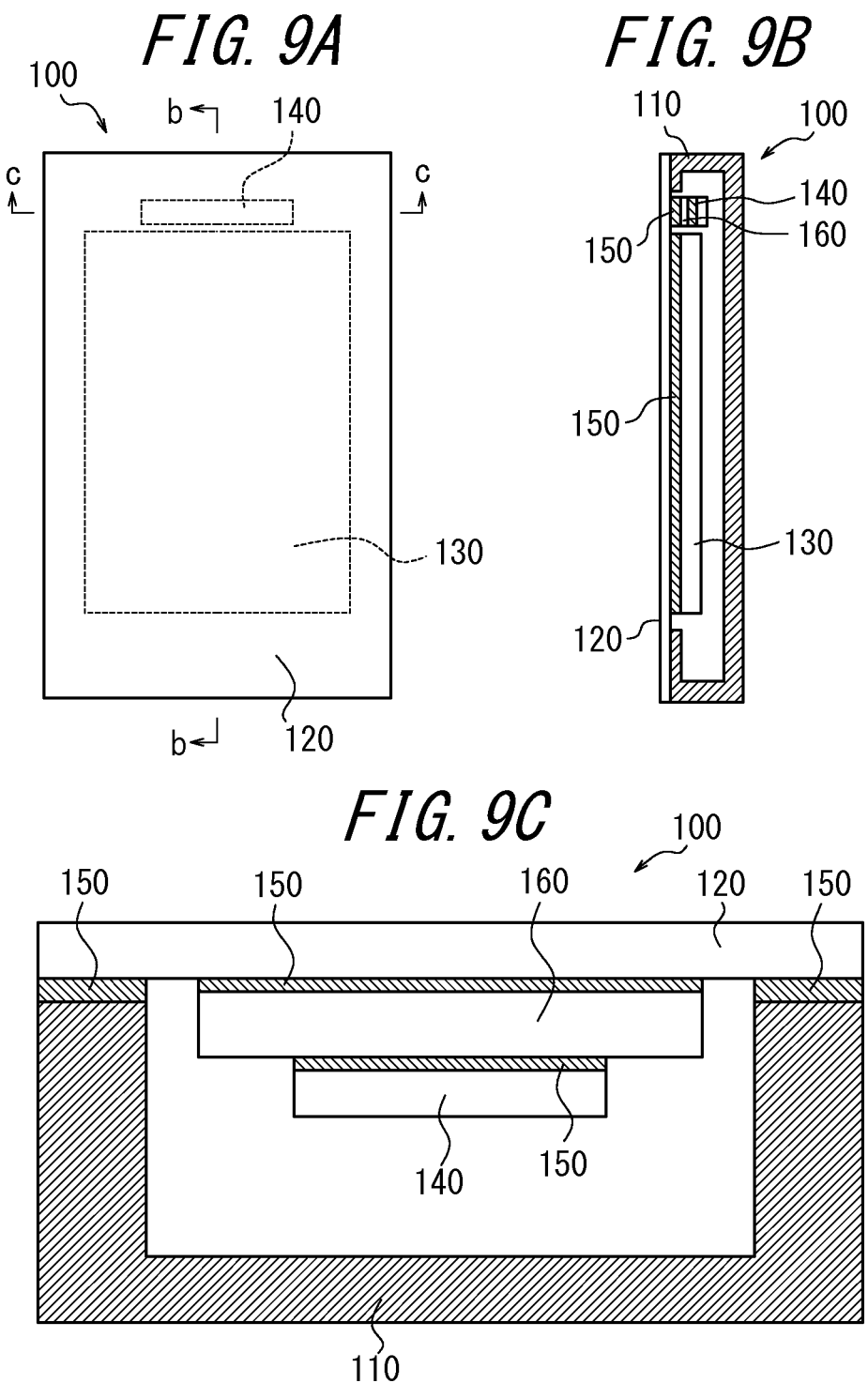

ELECTRONIC DEVICE

CROSS-REFERENCE TO RELATED APPLICATION

This application claims priority to and the benefit of Japanese Patent Application No. 2011-033947 filed Feb. 18, 2011, the entire contents of which are incorporated herein by reference.

TECHNICAL FIELD

The present invention relates to an electronic device that includes and vibrates a panel forming the external appearance of the electronic device.

BACKGROUND

Touch panels, touchpads, and the like are now widely being used as input apparatuses in electronic devices. In such input apparatuses, a technique has been proposed to provide a sense of operation as feedback to an operator's fingertip or the like by flexure vibration of the touch panel, touchpad, or the like when the operator operates the touch panel or touchpad (for example, see Patent Literature 1).

CITATION LIST

Patent Literature 1: JP2010044497A

SUMMARY

In the electronic device in Patent Literature 1, however, no measures are taken to prevent dust or water from entering into the device. Therefore, it may be assumed that dust or water will enter through, for example, a gap between the touch panel and a member to which the touch panel is fixed.

This problem may be assumed to occur potentially as well in an electronic device that includes and vibrates a panel forming the external appearance of the electronic device. Another type of electronic device that vibrates a panel is, for example, an electronic device that transmits sound to a user by applying a predetermined electrical signal (audio signal) to vibrate the panel so that vibration is transmitted to a portion of the user's body in contact with the panel (for example, cartilage of the outer ear). Yet another type of electronic device that vibrates the panel is an electronic device having a function to eliminate moisture or dirt on the panel by vibrating the panel.

Therefore, for an electronic device that includes and vibrates a panel forming the external appearance of the electronic device, it is preferable to improve dust resistance and water resistance while making it difficult to inhibit vibration of the panel.

An electronic device according to the present invention includes a panel; a vibration unit configured to vibrate the panel; and an image display unit adjacent to a back side of the panel, wherein the image display unit is held suspended from the panel via a flexible member disposed along an entire periphery of the image display unit.

According to the present invention, for an electronic device that includes and vibrates a panel forming the external appearance of the electronic device, dust resistance and water resistance can be improved while making it difficult to inhibit vibration of the panel.

BRIEF DESCRIPTION OF DRAWINGS

The present invention will be further described below with reference to the accompanying drawings, wherein:

FIG. 9A is a front view of a modification to another electronic device to which the present invention may be applied, FIG. 9B is a cross-sectional diagram along line b-b in FIG. 9A, and FIG. 9C is a cross-sectional diagram along line c-c in FIG. 9A.

DESCRIPTION OF EMBODIMENTS

The following describes embodiments of the present invention in detail with reference to the drawings.

Figure 1:
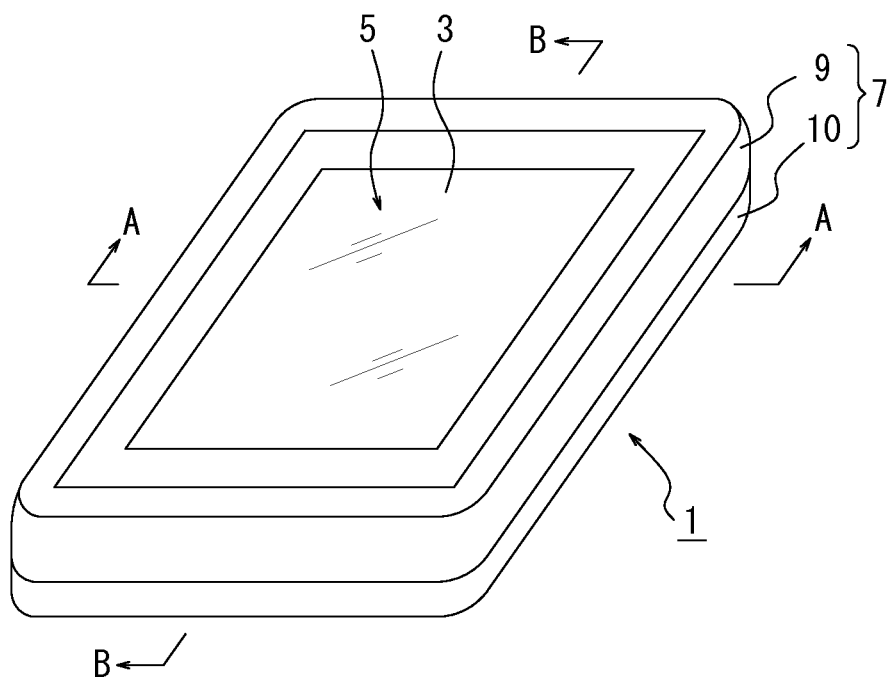
FIG. 1 is a perspective view of an electronic device according to one embodiment of the present invention.

As illustrated in FIG. 1, an electronic device 1 (an example of which here is a mobile phone terminal) according to the present embodiment is provided with an input apparatus body 5 and a housing 7 that houses and holds the input apparatus body 5. The input apparatus body 5 detects an input operation by an operator, and in accordance with the input, provides a vibration to a touch panel 3 so as to provide a sense of operation as feedback to the operator via the touch panel 3.

Figure 2A:
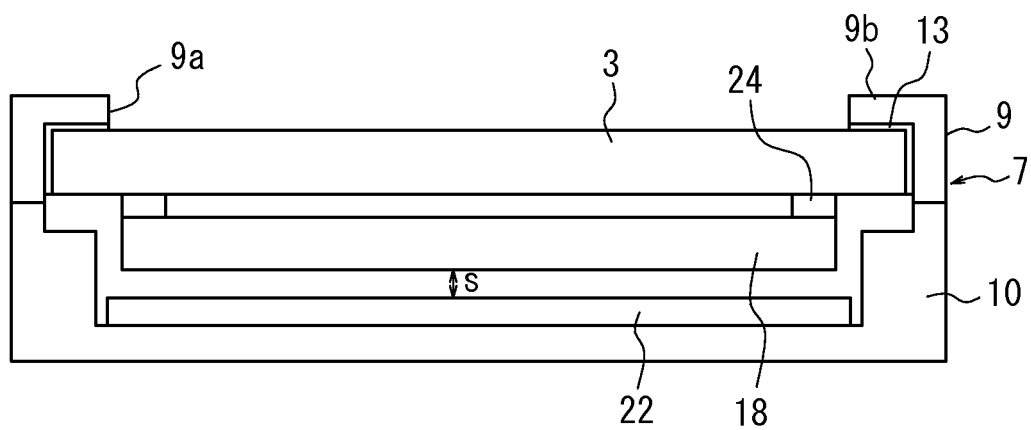
FIG. 2A is a cross-sectional diagram along line A-A in FIG. 1.
Figure 2B:
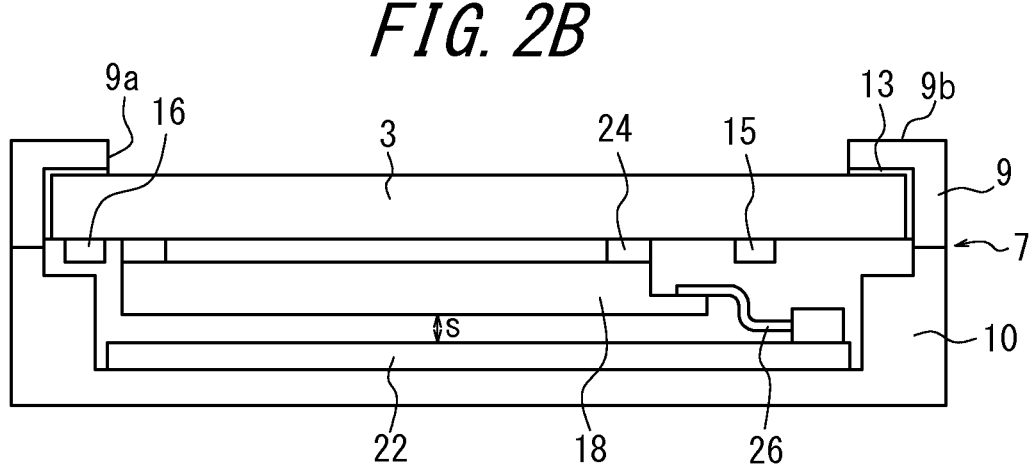
FIG. 2B is a cross-sectional diagram along line B-B in FIG. 1.
Figure 3:
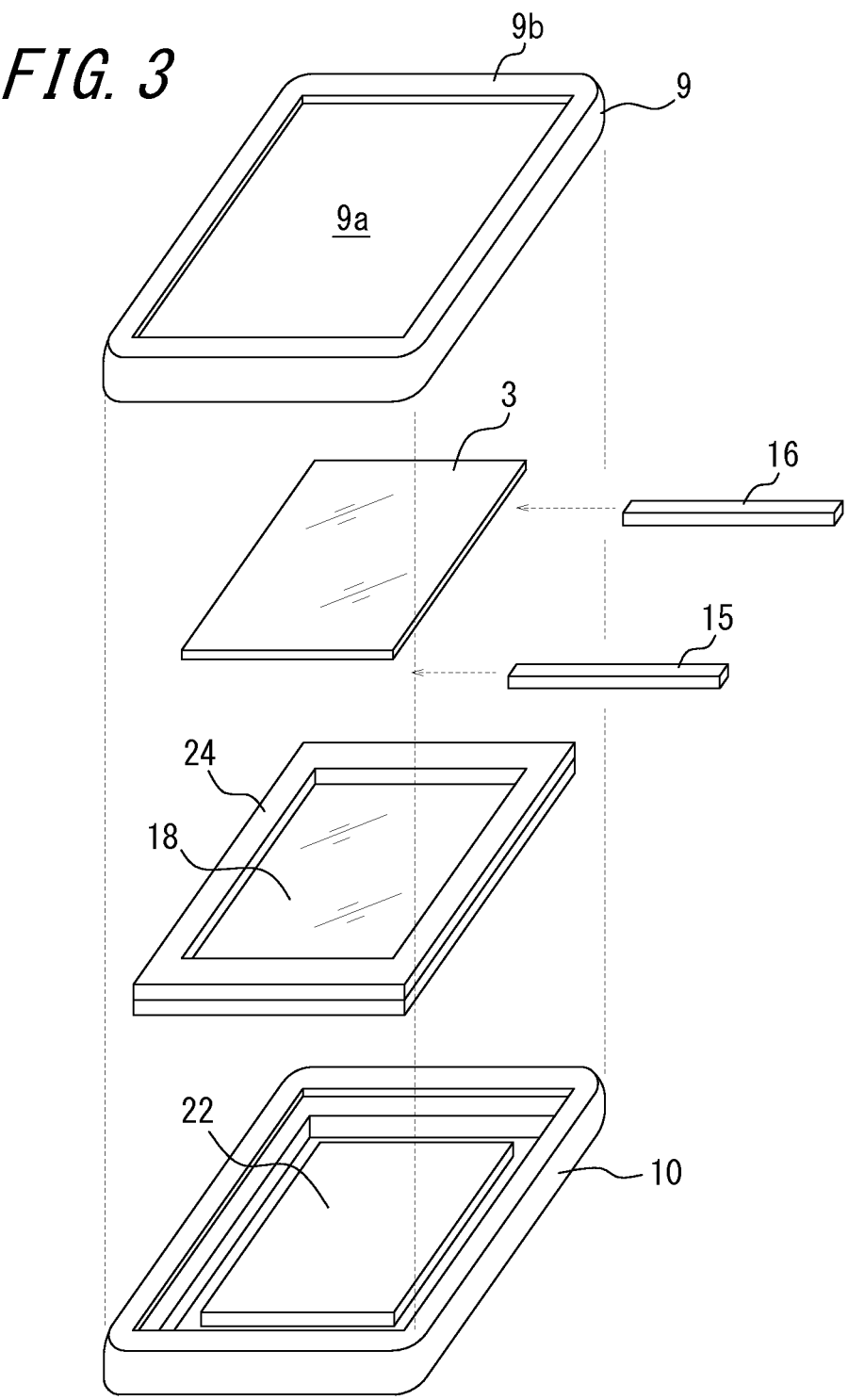
FIG. 3 is an exploded perspective view of the electronic device in FIG. 1.

As illustrated by the details on the electronic device 1 in FIGS. 2A, 2B and FIG. 3, the housing 7 includes an upper housing 9 as a support member supporting the touch panel 3 and a rectangular cup-shaped lower housing 10 that forms a housing space for the input apparatus body and matches the lower edge of the upper housing 9. Here, the upper housing 9 and the lower housing 10 are fixed tightly by a non-illustrated packing. The upper housing 9 and the lower housing 10 can be formed using a relatively hard synthetic resin material or metal material.

At the top of the upper housing 9, an opening 9a is formed to expose a touch face of the touch panel 3 to the outside in order to allow for operations on the touch panel 3, and around the opening 9a, a bezel 9b is provided integrally to cover the periphery of the touch panel 3. The upper housing 9 holds the touch panel 3 at the underside of the upper housing 9 via a cushion member 13 formed with an elastic material. The upper housing 9 and the cushion member 13, as well as the cushion member 13 and the touch panel 3, can respectively be adhered using double-sided tape, adhesive, or the like. The quality of the material for the cushion member 13 is preferably such that vibration is not inhibited in so far as possible. For example, soft urethane foam (preferably microcellular urethane foam), silicone foam, silicone rubber, or the like may be used.

Note that the upper housing 9 should hold the touch panel 3 at least at the four corners of the upper housing 9, but from the perspective of improving the bearing strength of the touch panel 3 and reducing the risk of dust or the like entering into the housing 7, a structure is preferably adopted such that the cushion member 13 is disposed along the entire periphery of the touch panel 3 to support the touch panel 3 with the entire periphery of the upper housing 9, as in the present embodiment. In this example, the touch panel 3 is held by the upper housing 9. A bezel (not illustrated) separate from the upper housing 9 may be provided, with this bezel serving as the support member of the present invention by holding the touch panel 3.

The input apparatus body 5 is provided with the above-described touch panel 3 supported by the upper housing 9, at least one vibration unit that vibrates the touch panel 3, here two vibration units 15 and 16, a display unit 18 disposed on the back side of the touch panel 3, and a substrate 22 that is disposed within the lower housing 10 so as to have a gap s with respect to the display unit 18 and that includes a control unit (not illustrated) that controls overall operations.

Details on the components of the input apparatus body 5 are now described. First, the touch panel 3 is rectangular in plan view and is set to be a thickness that allows for vibration (flexure deformation) upon receiving vibration from the vibration units 15 and 16. Here, the touch panel 3 includes a function to detect an operation by the operator on an object displayed on the display unit 18, i.e. to detect the position of a finger, stylus pen, or the like on the touch panel 3, and to notify the control unit provided in the substrate 22 of the detected position. The touch panel 3 may be of a type such as a resistive film type, a capacitive type, an optical type, or the like.

In order to detect an operation by the operator on an object displayed on the display unit 18, it is not essential for a finger, a stylus pen, or the like to physically contact the touch panel 3. For example, if the touch panel 3 is an optical type (infrared scan type), an infrared ray, produced by a light emitting element (not illustrated) that can be disposed within a bezel or the like, scans along the upper surface of the touch panel 3, and the position at which the infrared ray is blocked by a finger or the like is detected, so that the touch panel 3 need not be contacted by a finger or the like.

The vibration units 15 and 16 are attached to the backside of the touch panel 3 near two opposing sides of the touch panel 3 (here, the two shorter sides) with adhesive or the like. The vibration units 15 and 16 are formed by piezo-electric elements that expand and contract in the longitudinal direction upon application of voltage. When the vibration units 15 and 16 expand and contract, the touch panel 3 repeatedly experiences curvature deformation (flexure deformation) in the direction of thickness thereof (the direction perpendicular to the touch face). The vibration units 15 and 16, for example, can generate a vibration with a predetermined vibration pattern (frequency, phase, waveform, amplitude) based on a signal from the control unit provided in the substrate 22. Depending on the vibration pattern, it is possible to provide the finger or the like in contact with the touch face with a tactile sensation such as when operating an actual button. For example, to provide a clicking sensation, as representatively provided by a metal dome switch used in a mobile terminal, the vibration units 15 and 16 are driven by one period of a drive signal, composed for example of a sine wave with a fixed frequency of 170 Hz, at the point at which a predetermined load is applied to the touch panel 3, so that under the application of the predetermined load, the touch panel 3 is vibrated approximately 15 μm. As a result, the operator can be provided with a realistic clicking sensation.

The display unit 18 is rectangular in plan view yet is slightly smaller than the touch panel 3. The display unit 18 may, for example, display an object of a push-button switch or the like, such as a key, as an image. The image displayed on the display unit 18 is not limited to a still image and may also be a moving image. In addition to a liquid crystal display (LCD), the display unit 18 can, for example, be an organic EL display or electronic paper.

The display unit 18 is held suspended from the touch panel 3 via a flexible seal member 24 disposed along the entire periphery of the front side (the touch panel side) of the display unit 18. As a result, the space between the touch panel 3 and the display unit 18 is tightly sealed. The quality of the material for the seal member 24 is not particularly limited, as long as the seal member 24 flexes in response to flexure deformation of the touch panel 3 while preserving a predetermined sealing property. For example, soft urethane foam (preferably microcellular urethane foam), silicone foam, silicone rubber, or the like can be used. The touch panel 3 and the seal member 24, as well as the seal member 24 and the display unit 18, can respectively be adhered using double-sided tape, adhesive, or the like.

Figure 4:
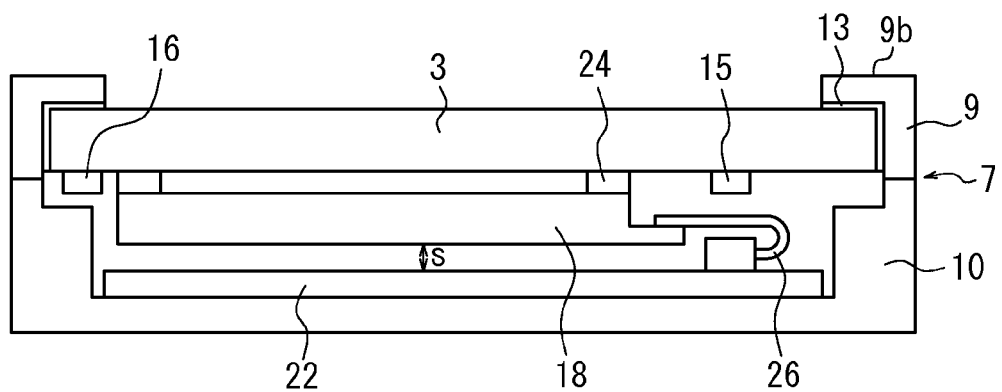
FIG. 4 is a cross-sectional diagram along the same cross-section as FIG. 2B and illustrates another example of a flexible printed board connecting a display unit and a substrate.

As illustrated in FIGS. 2A and 2B, when the above input apparatus body 5 is assembled within the upper housing 9 and the lower housing 10, the touch panel 3 is supported by the upper housing 9, which acts as a support member, and the display unit 18 is held suspended from the touch panel 3 via the seal member 24. As a result, a gap s forms between the display unit 18 and the substrate 22. The gap s can be set as needed in accordance with the magnitude of the flexure deformation of the touch panel 3. For example, the gap s can be set to be approximately 0.1 mm when the touch panel 3 is at rest. Note that in FIG. 2B, the reference numeral 26 refers to a flexible printed board that connects the display unit 18 and the substrate 22. This flexible printed board is preferably bent in advance, or folded as illustrated in FIG. 4, in anticipation of displacement of the display unit 18.

In the electronic device 1 of the present embodiment, upon the vibration units 15 and 16 vibrating based on a drive signal from the control unit, the vibration is transmitted to the touch panel 3, and a sense of operation is provided as feedback to the operator via the touch panel 3. At this point, since the display unit 18 is held suspended from the touch panel 3, with the gap s between the display unit 18 and the substrate 22, the degree of freedom of deformation (ease of deformation) of the touch panel 3 in the thickness direction can be increased.

Figure 5A:
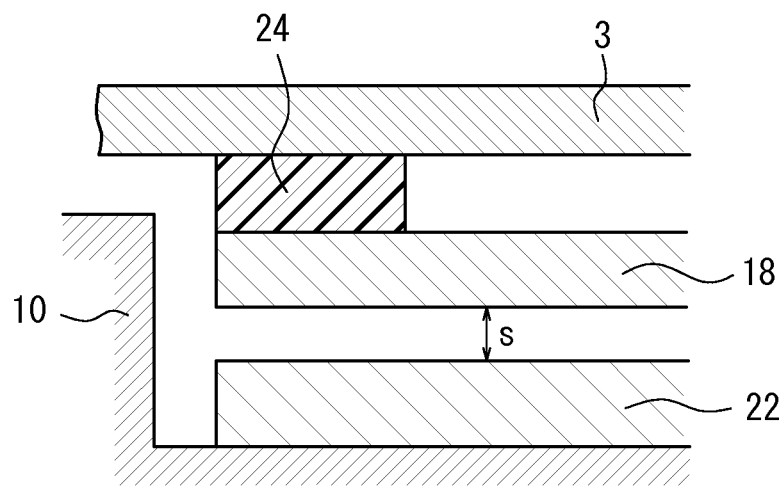
FIGS. 5A and 5B is a partial cross-sectional diagram of the electronic device in FIG. 1, with FIG. 5A illustrating a touch panel at rest, and FIG. 5B illustrating flexure deformation of the touch panel towards the display unit.
Figure 5B:
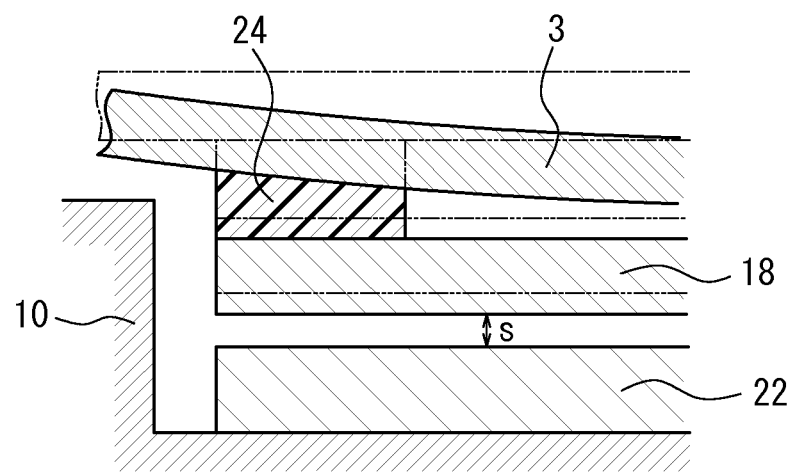

According to the electronic device 1 of the present embodiment, when the touch panel 3 is at rest as illustrated in FIG. 5A, the seal member 24 experiences tensile deformation due to the tensile load of the display unit 18, and in this state, when the touch panel 3 experiences flexure deformation, the seal member 24 can also be freely displaced along with this deformation within the gap s between the display unit 18 and the substrate 22, as illustrated in FIG. 5B, so that the seal member 24 does not reach the compressed limit. Therefore, the degree of freedom of deformation of the touch panel 3 in the thickness direction (in particular, in the direction towards the display unit 18) may be increased without losing physical space for flexure deformation of the touch panel 3 due to the presence of the seal member 24, and the amplitude when the touch panel 3 vibrates can be secured. Furthermore, in such a structure to hold the display unit 18 suspended from the touch panel 3 via the seal member 24, the device does not become large, since the height (thickness) of the seal member 24 is be increased. Since the display unit 18 is held suspended from the touch panel via the flexible seal member 24, the degree of freedom of deformation of the touch panel 3 in the thickness direction can be increased.

Furthermore, according to the electronic device 1 of the present embodiment, the space between the touch panel 3 and the display unit 18 is sealed by the seal member 24, thus allowing for a reduction of entry of dust or moisture(water) between the touch panel 3 and the display unit 18. While the risk of entry of dust or moisture (water) is reduced with the flexible seal member 24 in the electronic device 1 of the present embodiment, a flexible member may be adhered to the touch panel 3 or the display unit 18. The entry of dust may also be reduced when using such a flexible member, and the entry of moisture (water) may be reduced by using water resistant double-sided tape for adhesion.

Furthermore, according to the electronic device 1 of the present embodiment, since the display unit 18 is held suspended from the touch panel 3, first forming the display unit 18 and the touch panel 3 as one assembly may simplify handling in subsequent manufacturing steps (assembly steps).

Furthermore, according to the electronic device 1 of the present embodiment, it becomes difficult for dust or the like to enter the housing 7 since the cushion member 13 is provided along the entire periphery between the bezel 9b of the upper housing 9 and the touch panel 3.

Note that "held suspended" in the present invention refers to the display unit being held suspended mainly from the touch panel and excludes neither a structure in which the display unit is supported secondarily by another surrounding component or the like nor a structure in which filler is provided between the display unit and its surroundings in order to increase shock resistance or the like.

Figure 6:
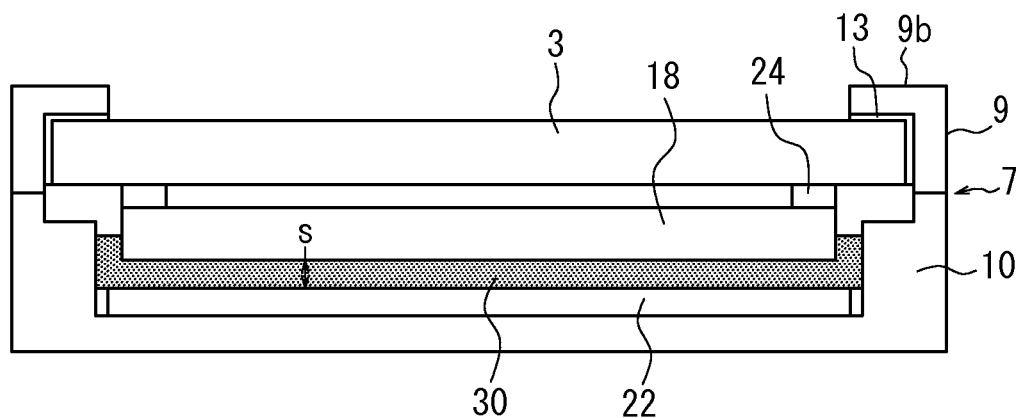
FIG. 6 is a cross-sectional diagram illustrating a similar cross-section as FIG. 2A of an electronic device according to another embodiment of the present invention.

Next, with reference to FIG. 6, an electronic device according to Embodiment 2 of the present invention is described. Note that the same reference signs are provided for similar components as in the above embodiment, and a description thereof is omitted.

The electronic device 1 of FIG. 6 differs from the above embodiment in that a filler member 30 is provided to fill, at least partially, the gap s between the display unit 18 and the substrate 22 and the gap between the display unit 18 and the lower housing 10. In other words, in the above embodiment, a space exists between the display unit 18 and substrate 22, and the display unit 18 is simply held suspended from the touch panel 3, whereas in the present embodiment, the display unit 18 is not only held suspended mainly from the touch panel 3 but is also supported secondarily by the filler member 30 provided between the display unit 18 and the substrate 22. Note that the material for the filler member 30 may, for example, be elastomer gel, sponge, silicone rubber, soft urethane foam, or silicone foam. Also, the filler member 30 may be provided only in the gap s between the display unit 18 and the substrate 22, or only in the gap between the display unit 18 and the lower housing 10.

Figure 7:
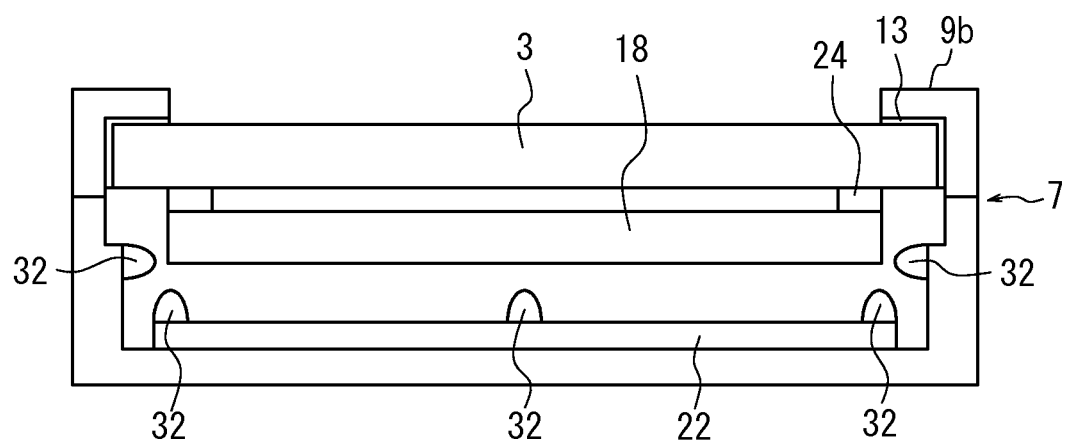
FIG. 7 is a cross-sectional diagram illustrating a similar cross-section as FIG. 2A of an electronic device according to yet another Embodiment of the present invention.

According to the present embodiment, since the filler member 30 is provided between the display unit 18 and the substrate 22, a shock to the display unit 18 when the electronic device 1 is dropped, for example, can be absorbed by the filler member 30, thereby improving durability. Furthermore, the filler member 30 only supports the display unit 18 secondarily and thus has little effect on vibration of the touch panel 3. Note that the filler member 30 need not be in constant contact with the display unit 18 and the substrate 22. For example, as illustrated in FIG. 7, instead of the filler member 30, projections 32 may be provided, with the projections 32 projecting from the substrate 22 and the lower housing 10 towards the display unit 18 without being in contact with the display unit 18 during normal operation. When a large shock occurs, such as when the electronic device 1 is dropped, the projections 32 may contact the display unit 18 and absorb the shock. The projections 32 may be of the same material as the filler member 30 or as the flexible member forming the seal member 24.

Although the present invention has been described based on the illustrated examples, the present invention is not limited to the above embodiments and may be modified as necessary within the scope of the claims. For example, the touch panel 3 used in the electronic device 1 according to the present invention may be a flat plate member, such as a simple "panel", that does not include a function to detect the position of contact by a finger or the like on the touch face (sensing function). In an electronic device with such a structure, when a load detection unit, for example, that detects a pressure load is provided, and the detected load satisfies a standard for a predetermined pressure load, it may be determined that contact has been made on the touch panel. Such a load detection unit can be configured by providing the touch panel 3 with any number of strain gauge sensors or the like. Furthermore, when the vibration units 15 and 16 are piezoelectric elements, the piezoelectric elements can also be used as a strain gauge sensor.

In the present invention, a component other than the components described in the above embodiments may be provided, such as a load detection unit. In this case, in addition to monitoring input to the touch panel, the control unit can monitor the load detected by the load detection unit. That is, the control unit can detect when input to the touch panel is input for an input object displayed on the display unit and furthermore when a pressure load that is detected by the load detection unit and that increases due to pressure on the touch panel satisfies a predetermined standard for accepting the input. The control unit may then accept input to the touch panel at that point and drive the vibration unit with a predetermined drive vibration in order to vibrate the touch panel with a predetermined vibration pattern that is set in advance. The predetermined standard may be set appropriately in accordance with the load characteristics during pressure to the intended push-button switch. The load detection unit may, for example, be configured using four strain gauge sensors which may be placed at the four corners of the touch panel, or, when the touch panel is a resistive film type, the load may be detected by change in an output signal based on the change in resistance variation due to contact area. In the case of a capacitive type touch panel, the load may be detected by change in an output signal based on change in capacitance.

In the above embodiments, a pair of piezoelectric elements is used for the vibration units 15 and 16, but any number of piezoelectric elements, or a transparent piezoelectric film that can be attached to the entire surface of the touch panel 3, may be used. An eccentric motor configured to rotate once per period of a drive signal may also be used.

In the above embodiments, the touch panel 3 is described as being supported by the upper housing 9, but, the touch panel 3 may be supported by the lower housing 10. In the above embodiments, the piezoelectric elements 15 and 16 are described as being attached to the bottom of the touch panel 3 on the outside of the seal member 24, yet the location of attachment may be on the inside of the seal member 24. Furthermore, in the above embodiments, the display unit 18 is described as being held suspended, yet the display unit 18 may be formed integrally with a holder, as in FIGS. 5A and 5B, and the display unit 18 and the holder may be held suspended.

In the above embodiments, a mobile phone terminal that includes a touch panel having a sensing function and that provides a sense of operation as feedback is exemplified, but the present invention is not limited to this example. The following describes another electronic device to which the present invention can be applied.

For example, an electronic device according to the present invention may be an electronic device that generates vibration in a panel, such as a cover panel that protects a touch panel or a display unit, by applying an electronic signal in accordance with a predetermined audio signal to a piezoelectric element attached to the panel. Such an electronic device may transmit sound to the user even if a portion of the user's body (for example, cartilage of the outer ear) is in contact with the vibrated panel.

A mobile phone device 100 described below is provided as an example of an electronic device to which the present invention can be applied and therefore is not limited to the structure illustrated in the figures. The structure of the mobile phone device 100 may be modified as needed to a degree that does not interfere with application of the present invention.

Figure 8A:
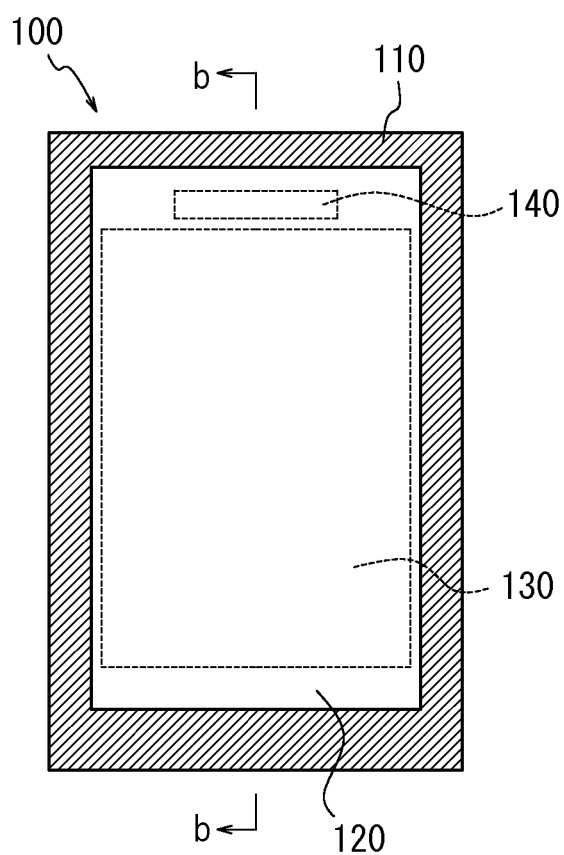
FIG. 8A is a front view of another electronic device to which the present invention can be applied.
Figure 8B:
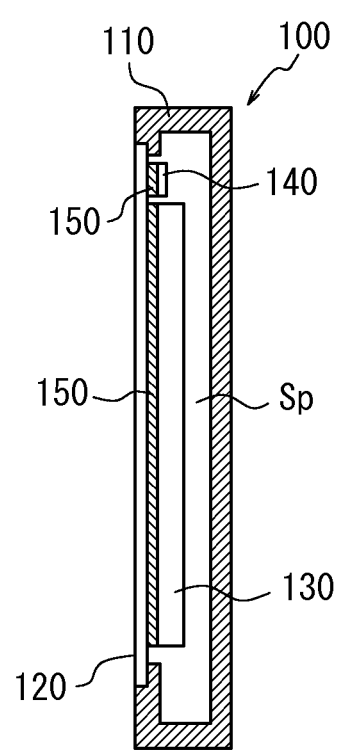
FIG. 8B is a cross-sectional diagram along line b-b in FIG. 8A.

FIGS. 8A and 8B illustrate another electronic device to which the present invention can be applied. FIG. 8A is a front view, and FIG. 8B is a cross-sectional diagram along line b-b in FIG. 8A.

As illustrated in FIGS. 8A and 8B, as another electronic device to which the present invention may be applied, the mobile phone device 100 is provided with a housing 110, a panel 120, a display unit 130, and a piezoelectric element 140. The display unit 130 and the piezoelectric element 140 are each attached to the panel 120 by a joining member 150. The panel 120, the display unit 130, and the piezoelectric element 140 are all approximately rectangular. The contact region between the piezoelectric element 140 and the joining member 150 may be nearly the entire surface of one main face of the piezoelectric element. In this case, as compared for example to when the contact region between the piezoelectric element and the joining member is only the edges of the piezoelectric element, vibration of the piezoelectric element 140 is efficiently transmitted to the panel 120, and the panel 120 can be caused to experience flexure vibration at a strength sufficient to prevent damping even when the panel 120 is in contact with a human body.

As illustrated in FIG. 8A, the display unit 130 is disposed at nearly the center in the shorter direction of the panel 120. The piezoelectric element 140 is separated by a predetermined distance from an edge in the longitudinal direction of the panel 120 and is disposed near this edge with the longitudinal direction of the piezoelectric element 140 extending along the short side of the panel 120. The display unit 130 and the piezoelectric element 140 are aligned in parallel on an inner face of the panel 120. For example, in a structure in which the panel 120 and the display unit 130 do not overlap, the piezoelectric element 140 may be disposed in the center of the panel 120. When the piezoelectric element 140 is disposed in the center of the panel 120, vibration of the piezoelectric element 140 is transmitted evenly to the entire panel 120, and the user can recognize audio even when the user's ear is brought into contact with the panel 120 at any of a variety of positions. Note that as in the above-described embodiments, a plurality of piezoelectric elements may be provided.

When the panel 120 is, for example, a touch panel, the panel 120 detects contact on the touch panel by a finger, pen, stylus pen, or the like. Any type of detection may be used in the touch panel, such as a capacitive type, a resistive film type, a surface acoustic wave type (or an ultrasonic wave type), an infrared type, an electromagnetic induction type, a load detection type, or the like. The panel 120 may be a protective panel for protecting the display unit 130. The material for the panel 120 is, for example, glass or synthetic resin and in plate-like shape.

According to the electronic device 1 of the present embodiment, when the panel 120 illustrated in FIG. 8A is at rest, the joining member 150 experiences tensile deformation due to the tensile load of the display unit 130, and in this state, when the panel 120 experiences flexure deformation, the joining member 150 can also be freely displaced along with this deformation within a space Sp at the back of the panel 120, as illustrated in FIG. 8B, so that the joining member 150 does not reach the compressed limit. Therefore, the degree of freedom of deformation of the panel 120 in the thickness direction (for example, in the direction towards the display unit 130) may be increased without losing physical space for flexure deformation of the panel 120 due to the presence of the joining member 150, and the amplitude when the panel 120 vibrates may be secured. Furthermore, in such a structure to hold the display unit 130 suspended from the panel 120 via the joining member 150, the device does not become large, since the height (thickness) of the joining member 150 need not be increased. Since the display unit 130 is held suspended from the touch panel via the flexible joining member 150, the degree of freedom of deformation of the panel 120 in the thickness direction can be increased.

The display unit 130 is a display device such as a liquid crystal display, an organic EL display, an inorganic EL display, or the like.

The piezoelectric element 140 is an element that, upon application of voltage, expands and contracts in accordance with an electromechanical coupling coefficient of the structural material. The piezoelectric element 140 may be a unimorph, bimorph, or laminated piezoelectric element. A laminated piezoelectric element includes a laminated bimorph element with layers of bimorph (for example, 16 or 24 layers). Such a laminated piezoelectric element is configured with a laminated structure formed by a plurality of dielectric layers composed of, for example, lead zirconate titanate (PZT) and electrode layers disposed between the dielectric layers.

The joining member 150 is adhesive, double-sided tape, or the like with a property of being thermosetting, ultraviolet curable, or the like. The joining member 150 may, for example, be optical elasticity resin, which is clear and colorless acrylic ultraviolet curing adhesive.

The mobile phone device 100 with the above structure may transmit sound to the user when a portion of the user's body is in contact with the panel 120 which vibrates due to expansion and contraction of the piezoelectric element 140.

The piezoelectric element 140 for example expands and contracts (flexes) in the longitudinal direction based on an electronic signal output by a non-illustrated control unit. Since the piezoelectric element 140 is attached to the panel 120 by the joining member 150, the panel 120 vibrates in conjunction with expansion and contraction of the piezoelectric element 140. The panel 120 vibrates not only in the region in which the piezoelectric element 140 is attached, but also in a region separate from the attachment region. At a given instant during vibration of the panel 120, portions with a relatively large vibration amplitude and portions with a relatively small vibration amplitude are distributed randomly over the entire panel. In other words, a plurality of vibration waves are detected across the entire panel.

By applying a predetermined electrical signal (audio signal) to the piezoelectric element, the above mobile phone device 100 generates vibration in a panel, such as a cover panel that protects a touch panel or a display unit, and sound may be transmitted to the user by the user bringing a portion of the body (for example, cartilage of the outer ear) into contact with the vibrated panel.

The output sound from the panel in the mobile phone device 100 is assumed to be the voice of the other party in a phone call, music including ringtones or songs, or the like. The music may be played back based on music data stored in internal memory, or music data stored on an external server or the like may be played back over a network.

When outputting audio based on vibration of the panel due to expansion and contraction of the piezoelectric element, low-pitched sound is often more difficult to hear than high-pitched sound. Therefore, an amplifier may be controlled to amplify only low-pitched sound.

When transmitting sound to the user by vibration of the panel, if a separate dynamic speaker is not provided, then it is not necessary to form an opening (sound discharge port) for sound transmission in the housing, thereby simplifying the dust resistant and water resistant structure of the electronic device. Note that a dynamic speaker may be provided separately. In this case, the sound discharge port for the dynamic speaker should be blocked by a waterproof sheet permeable by air but not liquid, such as Gore-Tex (registered trademark) or the like.

The piezoelectric element causes vibration not only in the region in which the piezoelectric element is attached to the panel, but also in a region of the panel separate from the attachment region. Therefore, the user may hear sound by bringing the ear into contact with any position on the panel. Adoption of the panel with a larger area than the user's ear allows the user to reduce the amount of surrounding sound (noise) that enters the external ear canal while being able to hear the sound output by the electronic device by bringing the ear into contact with the electronic device, which is provided with the panel that is almost the same size as the user's ear or larger than the user's ear, so as to cover the entire ear. The region of the panel that vibrates should be larger than a region having a length corresponding to the distance from the helix to the tragus and the antitragus, and a width corresponding to the distance from the crus of the helix to the antihelix. The average size of an ear, for example a Japanese person's ear, can be looked up in sources such as the Japanese Body Dimension Database (1992-1994) gathered by the Research Institute of Human Engineering for Quality Life (HQL). If the panel is manufactured using the size of a Japanese person's ear as a guideline, it may be thought that the panel will be usable for most non-Japanese people.

Since the above mobile phone device 100 is capable of transmitting sound to the user by vibration via a portion of the user's body (for example, cartilage of the outer ear), less sound is transmitted to the periphery by air vibrations than with a dynamic speaker. Accordingly, this structure may be suitable for example for listening to a recorded message inside a train or the like.

The above mobile phone device 100 transmits sound by vibration of the panel 120, and therefore even if the user is wearing earphones or headphones, the user may hear sound through the earphones or headphones and through a part of the body by touching the electronic device against the earphones or headphones.

Furthermore, in the above mobile phone device 100, the display unit 130 and the piezoelectric element 140 are aligned in parallel on an inner face of the panel 120. By attaching the display unit 130 to the panel 120, the stiffness of the lower part of the panel 120 (the lower side in FIG. 8) thus increases, making it possible to cause the upper part of the panel 120 (the upper side in FIG. 8), where the piezoelectric element 140 is attached, to vibrate more than the lower part of the panel 120. It is thus possible to transmit vibration of the panel 120 efficiently to the user.

Note that when a panel vibrating in this way is contacted with the human body in order to transmit sound, the voltage applied to the piezoelectric element should be set higher than the voltage applied to a piezoelectric element incorporated into a normal panel speaker. The reason is that the support structure for the housing of the panel differs. For example, in the case of the panel speaker disclosed in JP2010114866A, the panel is supported by the housing at both ends in the longitudinal direction so that the entire panel moves vertically in the direction of panel thickness. By contrast, the above mobile phone device 100 has a structure such that the entire outer periphery of the panel 120 is supported by being attached to the housing 110 by the joining member 150. In other words, the panel 120 in the mobile phone device 100 is more firmly fixed to the housing than the panel of the panel speaker disclosed in the above literature. Accordingly, the voltage applied to the piezoelectric element 140 of the mobile phone device 100 is higher than the voltage applied to the piezoelectric element incorporated into a normal panel speaker.

While the mobile phone device 100 has been described above, the mobile phone device 100 is not limited to the above structure, and a variety of modifications are possible. FIGS. 9A-9C illustrates a modification to another electronic device to which the present invention can be applied. FIG. 9A is a front view, FIG. 9B is a cross-sectional diagram along line b-b in FIG. 9A, and FIG. 9C is a cross-sectional diagram along line c-c in FIG. 9A.

As illustrated in FIGS. 9A-9C, an intermediate member 160 may be disposed between the piezoelectric element 140 and the panel 120. In this case, the piezoelectric element 140 and the intermediate member 160 may be attached by the joining member 150, and the intermediate member 160 and the panel 120 may also be attached by the joining member 150. The joining member 150 may be any of the above-described adhesives or double-sided tape.

The intermediate member 160 is, for example, a resin board, sheet metal, or a resin board that includes glass fiber. Disposing the intermediate member 160 between the piezoelectric element 140 and the panel 120 may reduce the probability of an external force being transmitted to and damaging the piezoelectric element if, for example, such a force is applied to the panel 120. By disposing the intermediate member 160 between the piezoelectric element 140 and the panel 120, the resonance frequency of the panel 120 also decreases, thereby improving the acoustic characteristics in the low frequency band. Note that instead of the intermediate member 160, a plate-shaped weight may be attached to the piezoelectric element 140 by the joining member 150. In this way, vibration of the panel can be prevented from damping easily even when the panel is in firm contact with a human body.

Furthermore, while a piezoelectric element is attached to the panel in the above mobile phone device 100, the piezoelectric element may be attached to a location other than the panel. For example, the piezoelectric element may be attached to a battery lid that is fastened to the housing and that covers a battery. Since the battery lid is often fastened to a different face than the panel in the mobile phone device, according to this structure the user can hear sound by bringing a part of the body (such as the ear) in contact with a different face than the panel.

An electronic device that transmits sound to a user via a portion of the user's body (for example, cartilage of the outer ear) as described above may transmit to the user both sound conducted by a portion of the user's body in contact with a vibrating panel (body conducted sound) and vibrations of air around the panel due to vibration of the panel (air-conducted sound).

Furthermore, the present invention is not limited to a mobile phone terminal, but may also be adopted in a variety of electronic devices that include a panel forming the external appearance of a display unit (such as a game terminal, a tablet PC, car navigation, and the like).

REFERENCE SIGNS LIST

1: Electronic device
3: Touch panel
5: Input apparatus body
7: Housing
9: Upper housing
10: Lower housing
13: Cushion member
15, 16: Vibration unit
18: Display unit
22: Substrate
24: Seal member

The invention claimed is:

1. An electronic device comprising:
an upper housing;
a lower housing;
a touch panel, a plane thereof being exposed to an outside of the upper housing with a periphery of the touch panel attached to the upper housing;
a vibration unit configured to vibrate the touch panel; and
a display unit adjacent to a back side of the touch panel, wherein
the display unit is attached to an opposite plane to the exposed plane of the touch panel via a flexible member disposed along an entire periphery of the display unit,
a periphery of the opposite plane of the touch panel is held suspended from neither the upper housing nor the lower housing directly or indirectly, and
the touch panel is connected to the upper housing only through the plane of the touch panel exposed to the outside and side planes of the touch panel that intersect with the plane as seen in a side cross-sectional view.

2. The electronic device according to claim 1, wherein the touch panel is large enough to cover an entire ear of a user.

3. An electronic device comprising:
a touch panel;
a vibration unit configured to vibrate the touch panel; and
a display unit adjacent to a back side of the touch panel, wherein
the display unit is held suspended from the touch panel with a first gap therefrom via a flexible member disposed along an entire periphery of the display unit,
the display unit has a second gap from an inside of a housing which holds the display unit,
the vibration unit comprises a piezoelectric element that expands and contracts in a longitudinal direction upon application of voltage,
the electronic device has long sides and short sides,
the longitudinal direction of the vibration unit is parallel with the short sides of the electronic device, and
the touch panel is connected to the upper housing only through the plane of the touch panel exposed to the outside and side planes of the touch panel that intersect with the plane as seen in a side cross-sectional view.

4. The electronic device according to claim 3, wherein the housing has an upper housing, wherein the upper housing supports a front side of the touch panel, the front side of the touch panel being opposite to the back side of the touch panel.

5. An electronic device comprising:
an upper housing;
a lower housing;
a touch panel, a plane thereof being exposed to an outside of the upper housing with a periphery of the touch panel attached to the upper housing;
a vibration unit configured to vibrate the touch panel; and
a display unit adjacent to a back side of the touch panel, wherein
the display unit is attached to an opposite plane to the exposed plane of the touch panel via a flexible member disposed along an entire periphery of the display unit,
a periphery of the opposite plane of the touch panel is held suspended from neither the upper housing nor the lower housing directly or indirectly, and
the vibration unit is connected to a surface of the touch panel opposite the plane of the touch panel exposed to the outside, and the vibration unit is peripherally outside a portion of the touch panel that overlaps with the display unit, as seen in a side cross-sectional view.

* * * * *